Oct. 31, 1967 L. STEINBRECHER ET AL 3,350,284
METHOD AND APPARATUS FOR MEASURING FLUORIDE ACTIVITY
Filed April 5, 1965 5 Sheets-Sheet 1
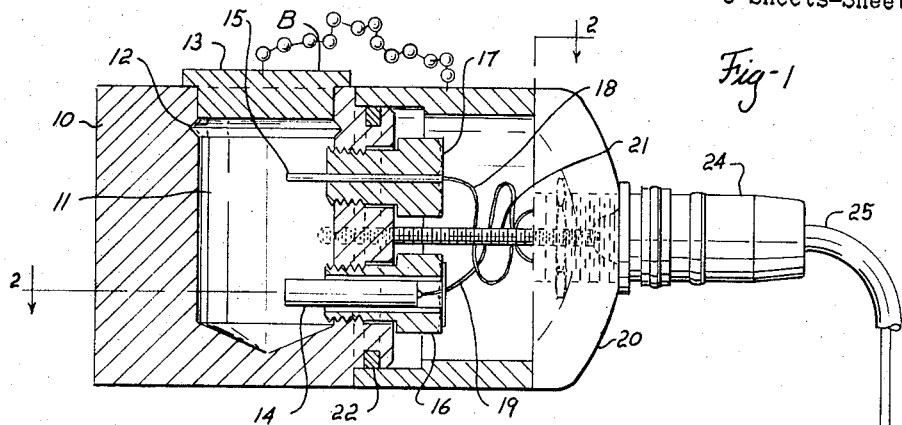
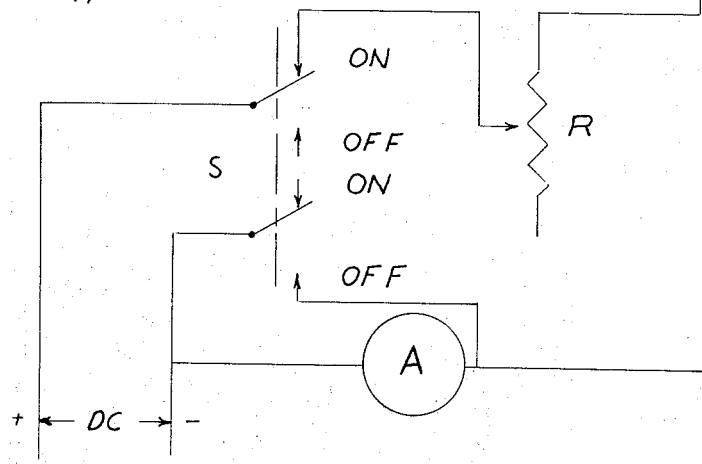
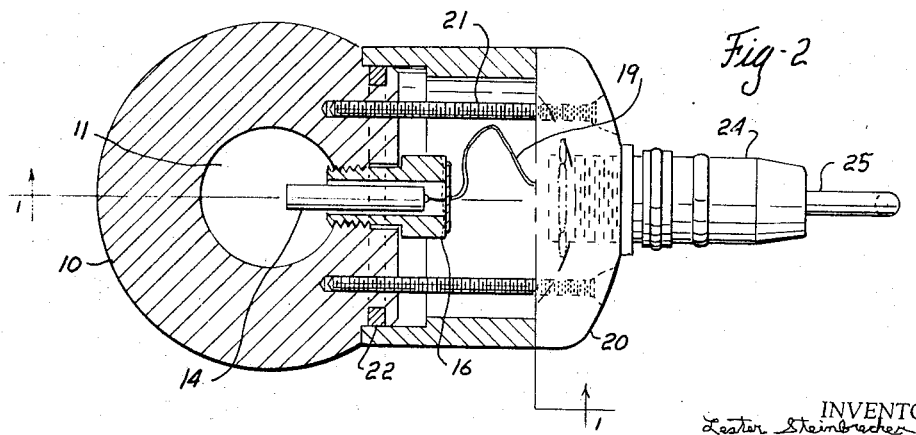
INVENTORS
Lester Steinbrecher
David Y. Dollman
Dwight E. Buczkowski
James W. Harrison
Synnestvedt & Lechner
ATTORNEYS

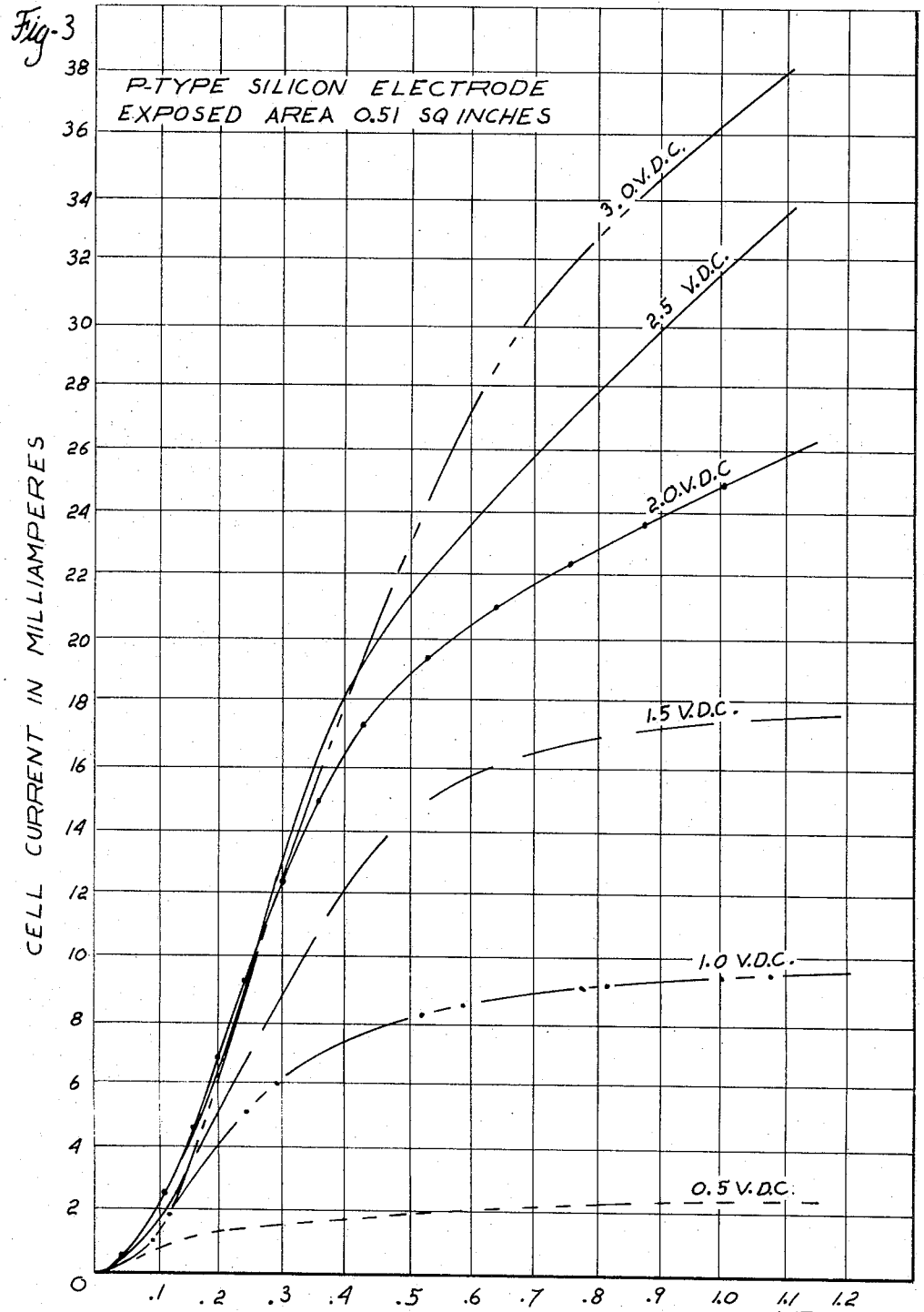

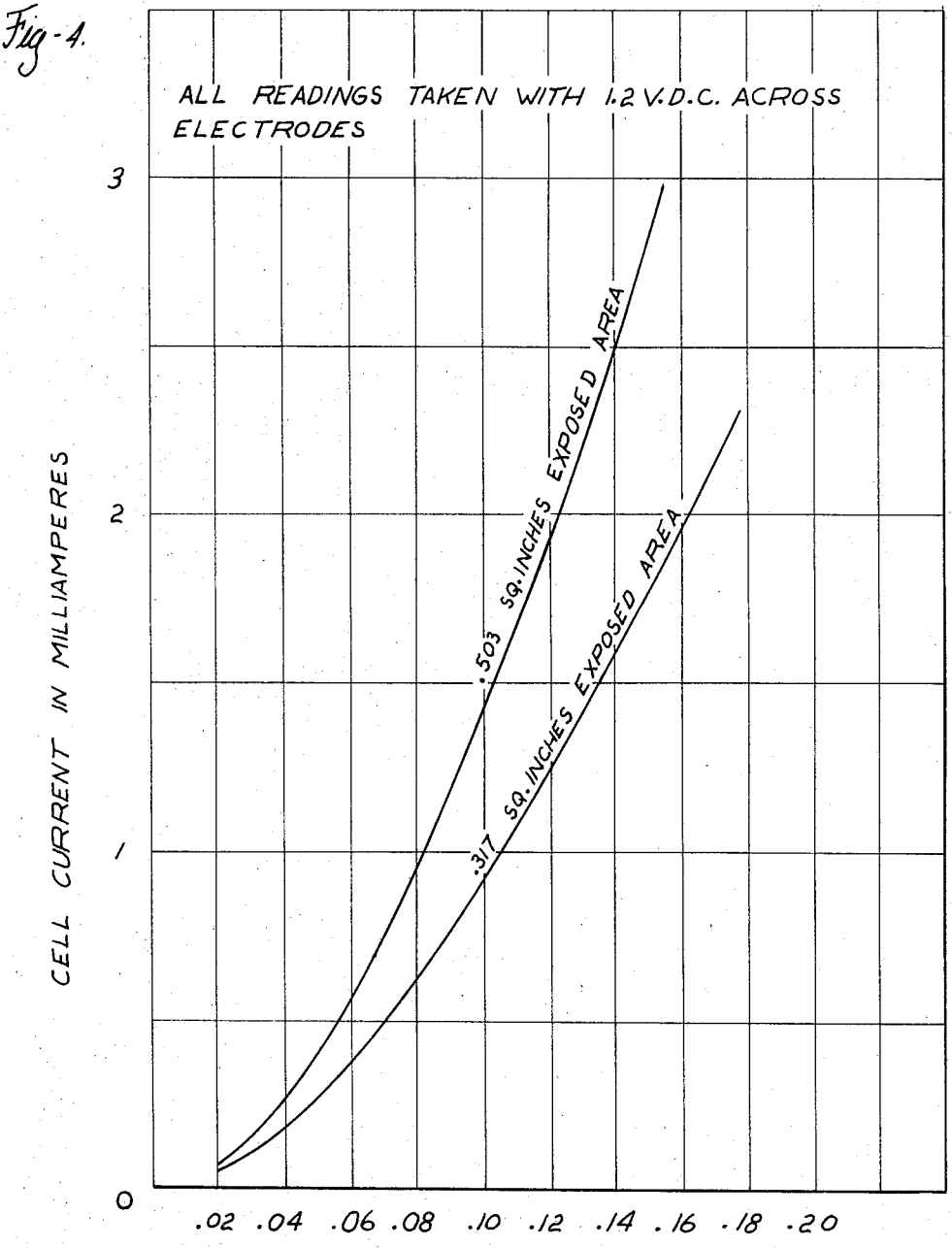

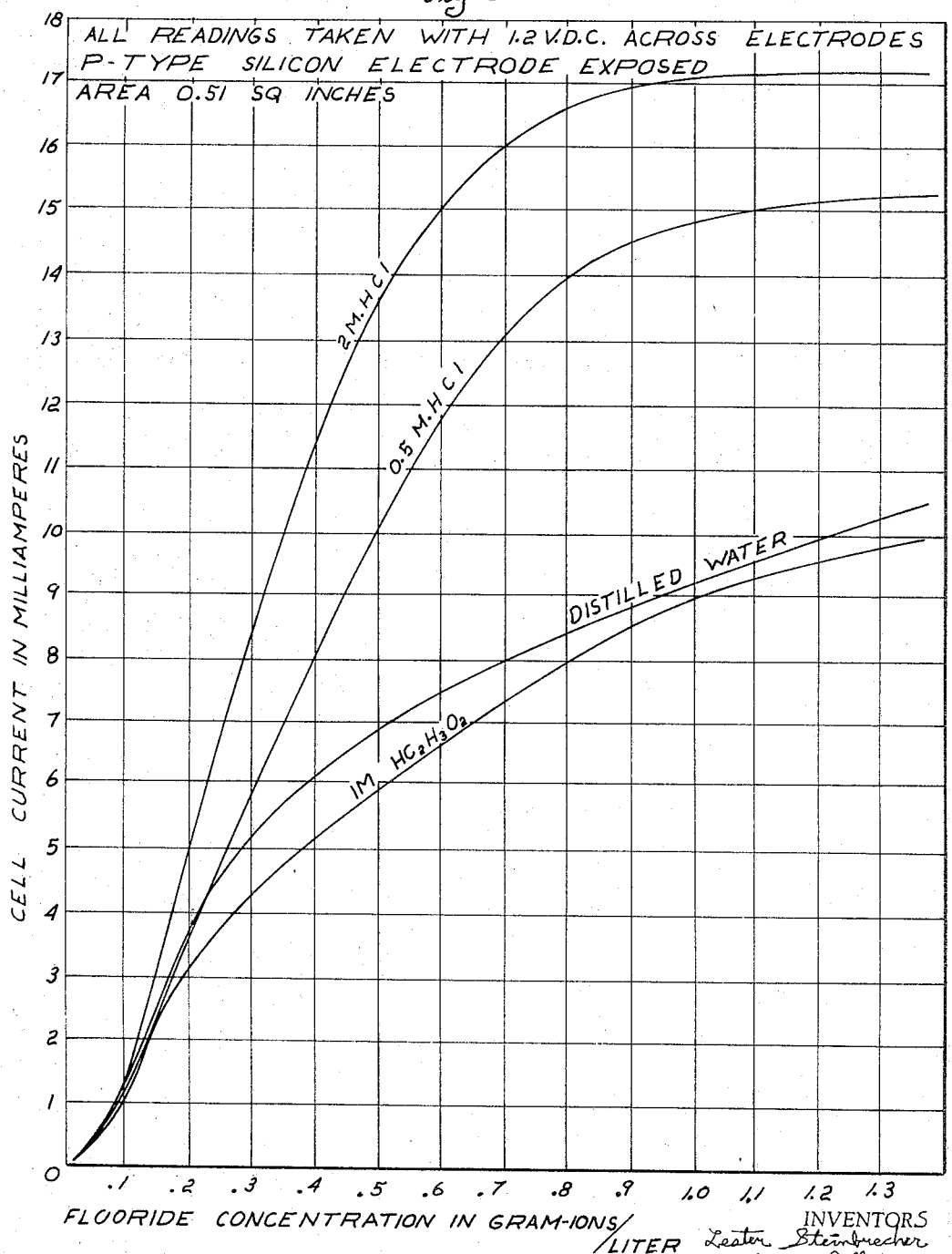

United States Patent Office 3,350,284
Patented Oct. 31, 1967

3,350,284
METHOD AND APPARATUS FOR MEASURING FLUORIDE ACTIVITY
Lester Steinbrecher, Philadelphia, David Y. Dollman, Lansdale, Dwight E. Buczkowski, Philadelphia County, and James W. Harrison, Wyndmoor, Pa., assignors to Amchem Products, Inc., Ambler, Pa., a corporation of Delaware
Filed Apr. 5, 1965, Ser. No. 445,681
3 Claims. (Cl. 204—1)

This application is a continuation-in-part of our copending patent application entitled "Method and Apparatus for Measuring Fluoride Activity," Ser. No. 292,670, filed July 3, 1963.

This invention relates to a method and apparatus for measuring fluoride activity in acidic aqueous solutions.

The terms "fluoride activity," "activity," and "active fluoride" are used herein to designate a property exhibited by fluoride when it is present in acidic aqueous solutions, or, stated another way, a property of the fluoride containing solution itself. For present purposes, the activity of the fluoride may be taken as its ability to cause a solution containing it to etch a piece of lime soda glass. Fluoride activity is an important property of many industrially important fluoride containing solutions. One class of such solutions which will be discussed briefly below are those used to form protective coatings on metals.

The actual form taken by the fluoride which enables it to exhibit fluoride activity as herein defined is not known. It is known, however, that fluoride activity is not a measure of the total amount of fluoride present in the solution in all forms. It is also known that certain complexes containing fluoride and certain unionized fluoride salts, such as aluminum fluoride, do not appear to contribute materially to the activity of an acidic solution. Furthermore, fluoride ion in neutral solutions does not appear to exhibit activity.

For these reasons, no attempt will be made here to construct a theoretical model of the mechanism by which fluoride activity is created. For the purposes of presenting the results obtained in the present invention in quantitative form, the viewpoint has been taken here that the activity is caused by fluoride ions. Thus the quantitative results will be expressed in terms of gramions of fluoride ion per liter. This form of expression is used merely for convenience and its not intended to express a position concerning the cause of fluoride activity, since this in fact unknown.

The method and apparatus have their primary utility in measurements made on acidic systems, since these are the systems in which, according to present experience, fluoride activity is present.

The invention is useful in monitoring fluoride activty in various types of solutions in which wide variety of other anions are present. Heretofore reliable measurements of fluorida activity have been inherently difficult to obtain because many analytical methods are unable to differentiate between fluoride activity and the total fluoride content. Total fluoride concentration is a relatively less important property than activity, since it is the activity of the solution which determines its degree of utilty for many purposes.

U.S. Patent 2,814,577 dscloses one analytical scheme which does have the ability to segregate the fluoride activity from the total fluoride content in a solution. The method taught by this patent involves a measurement of the ability of the solution to etch ordinary glass. While it is extremely useful, the procedure is time consuming and somewhat tedious. In addition, equipment such as an analytical balance is necessary to quantitize the results obtained. The present invention provides equipment for readily and accurately measuring fluoride activity in a very simple manner.

One field in which fluoride containing solutions are used extensively is in the art of producing corrosion resistant and decorative coatings on metals. The following U.S. patents illustrate processes employing aqueous solutions of fluoride for treating a variety of metals including aluminum, iron, steel, etc.: 2,438,877; 2,472,864; 2,678,291; 2,814,577; 2,909,455; 2,936,254; 2,796,370; 2,851,385; 3,009,842; 2,114,151; 2,507,956. In the solutions of these processes the principal and essential ingredients are usually fluorides and hexavalent chromium. In certain of the processes additional material, such as phosphate, arsenates and complex cyanides are also present in the treating solutions.

In the operation of metal treating processes, it is quite important to maintain the concentrations of the coating producing ingredients at substantially constant values as successive metal products are treated, in order to obtain a uniform quality of coating from product to product. Because of the inherent difficulty of measurement of fluoride activity and hence difficulty in controlling that ion, it has not been easy to achieve the desired high degree of uniformity of product. The method and apparatus of this invention have proved quite useful in overcoming this problem and they will be discussed herein principally in the context of equipment especially tailored for use in the metal treating industry. However, it should be understood that the method and apparatus are of utility in a wide variety of other applications.

According to the invention fluoride activity is measured by placing the solution in an electrolytic cell having two electrodes, one of which is composed of p-type silicon. A voltage is placed across the electrode and the current passing through the solution is measured. It is preferred that the equipment be arranged so that the cell and the electrodes are kept in darkness during the measurement but the method and equipment operate well in light of ordinary intensity. It has been discovered that over a substantial range of fluoride activity, the current passing through the cell is a function which is directly relatable to the fluoride activity. This relationship has been found to hold even though other anions are present in the solution and even though the pH of the solutions varies.

In accordance with another aspect of the invention a method and equipment are provided for monitoring the fluoride activity of a solution substantially continuously. In order to accomplish this, special steps are taken to automatically clean the electrode of the measuring cell which tends to become covered with a film during use. The periodic cleaning of one of the measuring electrodes, which contributes greatly to making continuous measurement practicable, is accomplished by providing a supplementary electrode in the cell and by periodically establishing a cleaning voltage between the electrode to be cleaned and the supplementary electrode, while the measuring voltage is temporarily interrupted.

It is an object of this invention to provide a method and apparatus for rapid and reliable measurement of fluoride activity in acidic solutions.

It is an object of this invention to provide a method and apparatus for rapid and reliable measurement of fluoride activity in order to facilitate applying coatings to metals.

A further object of the invention is the provision of a method and apparatus for monitoring fluoride activity in solutions containing other ingredients, for example, solutions such as those used in the metal treating art.

Still another object of the invention is the provision of a method and apparatus for monitoring fluoride activity in solutions on a continuous basis.

The above objects and purposes together with others may be more readily understood by a consideration of the detailed description which follows, together with the accompanying drawings in which:

FIGURE 1 is a side elevational view of a measuring apparatus constructed according to the invention, the view being partly in section with the section being taken along the line 1—1 of FIGURE 2 and with a portion of the view showing diagrammatically the wiring associated with the measuring apparatus;

FIGURE 2 is a cross sectional plan view of the measuring apparatus shown in FIGURE 1, the section being taken on the line 2—2 of FIGURE 1;

FIGURE 3 is a graph illustrating the effect of varying the voltage which is applied to the electrodes on measurements according to the invention;

FIGURE 4 is a graph showing the effect of altering the area of the silicon electrode used in making measurements according to the invention;

FIGURE 5 is a graph showing the relationship between fluoride activity and the measured cell current in solutions containing various other anions.

Figure 6:
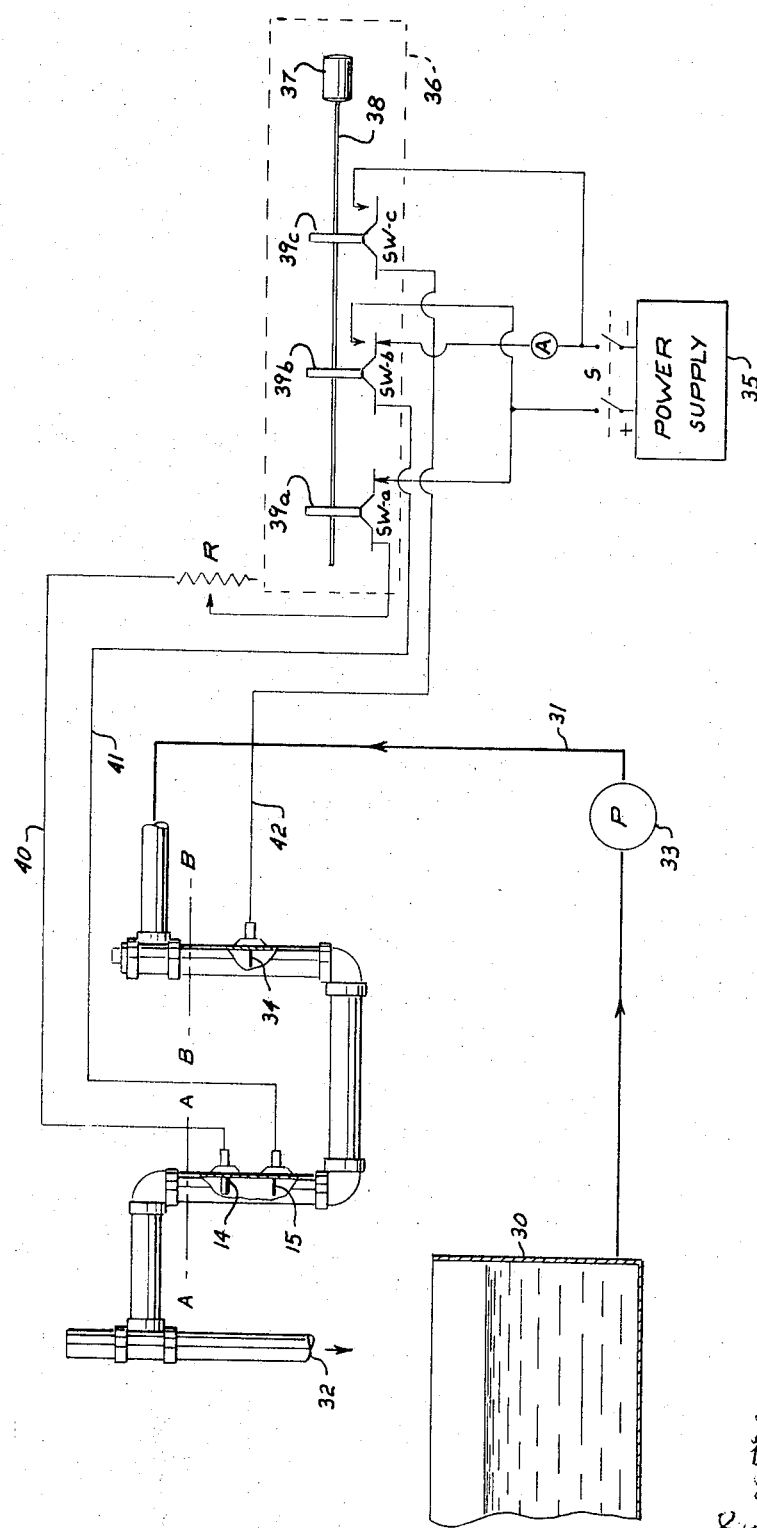
FIGURE 6 is a somewhat diagrammatic illustration of an embodiment of the invention adapted for continuous monitoring of fluoride activity.

Attention is first directed to FIGURES 1 and 2. As can be seen there is illustrated in those figures, a cell 10 having a sample holding compartment 11 therein. The cell may conveniently be constructed of opaque polyvinyl chloride plastic material, which is substantially insensitive to fluoride solutions. The compartment is generally cylindrical in shape, and near the top has a groove 12 which serves as a filling guide. In use the cell is filled with the sample upon which the measurements are to be made up to the groove 12. A cap 13 is provided which when in place completely darkens the sample compartment 11. Mounted in the side of the cell 10 are two electrodes, one of which is the p-type silicon electrode 14, and the other is an inert electrode 15, preferably made of platinum. The electrodes are mounted in plastic bolts 16 and 17. The use of an opaque construction material produces a cell from which light is readily excluded. If desired, however, a transparent or translucent material may be used for the cell, and a separate light shield employed to exclude light.

The p-type silicon electrode 14 is desirably cylindrical in shape. A piece of polyvinyl chloride tube can readily be heat shrunk onto the cylindrical electrode, leaving the desired area protruding beyond the end of the tubing. The tubing is cemented in a hole bored in the plastic bolt 16 which is threaded into the cell 10. The inert electrode 15 may conveniently be a platinum wire which is drawn through a fine hole in bolt 17. A lead wire 18 is attached to the platinum electrode, and a lead wire 19 is fastened to the silicon electrode. The plastic bolts are enclosed in a protective casing 20 which is attached to the cell by means of screws 21. An O-ring 22 is utilized to insure that a tight seal is obtained for further protection of the wiring. The lead wires 18 and 19 are passed through a connector 24 and a cable 25 leading to the external electrical circuit which is shown diagrammatically in FIGURE 1.

Turning now to the circuit, it can be seen that a source of direct current is applied with the positive side connected to the silicon electrode and the negative side connected to the inert electrode. An ammeter marked "A" in FIGURE 1 is placed in series with the cell. While it is shown on the negative side of the cell in the drawing, this is merely for convenience and the meter may in fact be positioned on either side. A switch S is employed to connect the power source to the cell. The variable resistor R is placed in the circuit so that the voltage placed across the cell may be adjusted by the operator.

The currents developed in the course of measurements of the fluoride solution will ordinarily be of the order of a few milliamperes, and the ammeter should have a suitable sensitivity in this current range.

The power supply should be adequate to provide about 2 volts and a standard mercury cell battery supplying about 1.35 volts, steady state, has been found to be quite satisfactory. If desired, such cells may be mounted in series to increase the available voltage and in parallel to increase the available current. In addition, for certain applications, standard dry cell batteries may be used.

The general operation of the invention with reference to FIGURE 1 is as follows. The solution to be measured is placed in the sample compartment 11 of the cell 10. Preferably the cap is then replaced, care being taken to insure that all light is excluded from the interior of the cell. A voltage is placed across the cell, and the current is measured by means of the ammeter A. When the circuit is closed, the ammeter will read a rather large current, which quickly falls so that a nearly steady state reading is obtained within about 2 to 6 minutes. The steady reading is the reading of interest, and when current values are referred to hereinafter it will be understood that reference is made to this steady reading. It should also be noted that the current values given are for unstirred solutions.

It has been found that the current reading on the ammeter is related to the degree of fluoride activity in the sample when expressed as fluoride ion concentration. With a given silicon electrode area, and a given applied voltage, the relationship between the current and the activity is approximately linear for dilute solutions. If the nature of the work requires greater precision than that expressed by this approximate relationship, or if the concentrations are great enough to make the relationship non-linear, accurate calibration curves can be developed to express the relationship for the particular measuring equipment and the particular type of system which is being measured.

The presence of other anions in the solution at small concentrations of fluoride activity has little effect on the relationship, but over wide ranges of activity, the current-activity relationship is altered somewhat, depending upon which anion or anions are present. The method and apparatus are nonetheless selective of fluoride activity, that is to say, they are substantially insensitive to moderate changes in the concentrations of the other anions. Once again, in the event measurements are being made on a system in which the effect of the other anions must be taken into account, precise calibration curves can be constructed for a particular system having in it other known anions.

With a p-type silicon electrode with a fixed area exposed to the sample, the slope of the curve defining the current-activity relationship varies with the applied voltage. For a given applied voltage, the slope of the curve defining the relationship varies with the area of the p-type silicon electrode which is exposed to the sample. It has also been noted that the slope of the curve may be modified by stirring the solution which is being measured. By adjusting these parameters it is possible to maximize the performance of a given cell to meet the particular analytical conditions encountered. The parameters of voltage and electrode area are particularly susceptible to adjustment, and in general it is preferred that stirring be avoided since it introduces fluctuations in the cell current.

As mentioned above, it is preferred that light be excluded from the sample during measurement. Light in ordinary quantities falling on the sample and the electrodes has only a slight effect on the cell current obtained. However, for precision work it is desirable to standardize and hold constant all factors which can readily be controlled. For this reason, the preferred arrangement of the equipment and method includes exclusion of light, or in other words standardization of the light at zero. On the other hand, for technical or routine measurements extremely high precision may not be required, and light of the type and quantity encountered under ordinary indoor conditions is tolerable.

The relative insensitivity to light of the present invention forms one special advantage offered over several known fluoride measuring methods utilizing silicon electrodes.

One such method is reported by D. R. Turner in "Saturation Currents at n-type Silicon and Germanium Electrodes in Chemical Etching Solutions" in the Journal of the Electrochemical Society, June 1961, pp. 561–563, and in a scientific communication entitled "A Simple and Rapid Method for Fluoride Ion Determination" in Analytical Chemistry, June 1961, pp. 959–960. This method utilizes an n-type silicon electrode and is viewed by Turner as measuring fluoride ion concentration. The method contemplates making the measurement on solutions of fluoride in concentrated nitric acid, while keeping the cell in darkness. Light introduces an undesirable variation in the cell current. This current is quite small.

Another known method is described in co-pending U.S. Patent application Ser. No. 236,266, filed Nov. 8, 1962, now U.S. Patent No. 3,129,148, Method and Apparatus for Measuring Fluoride Activity, of Steinbrecher et al., assigned to the same asignee as this application. This method differs from Turner in that it is capable of measuring fluoride activity on a wide variety of dilute fluoride solutions, and in that the cell current produced is considerably greater. One step in this method not present in Turner is the use of light of fixed intensity and spectral distribution.

Light, to the extent that it affects the present invention, causes a slight decrease in the cell current. But the relative lack of sensitivity means that simplifications in procedure and equipment over both of the above teachings is attained. Beyond this the cell current produced in the present invention is several times greater than that produced by the method utilizing n-type silicon and fixed light, and much greater than that produced by n-type silicon in the dark in nitric acid solution. The increased current, and changes therein, are more conveniently and reliably measured, than the smaller currents of the known procedures.

In order to amplify and understanding of the above considerations, attention is now directed to FIGURE 3, 4 and 5. The data on these figures were gathered by means of an instrument such as that shown in FIGURES 1 and 2.

In gathering the data on FIGURES 3 and 4, a representative metal treating solution was employed as the base solution. The fluoride activity of the base solution was amplified during the development of the data by adding hydrofluoric acid to the base solution. The other components of the treating solution used consist of 14.1 grams per liter of chromic acid and 40 grams per liter of phosphoric acid. These concentrations were held constant, even though the fluoride activity was varied.

FIGURE 3 illustrates the way the relationship between cell current and fluoride activity changes as the applied voltage is changed when the silicon electrode area is held constant. As can be seen from the figure, there results a family of curves with generally increasing slopes as the voltage is increased. It should be noted that the change resulting from a given increment in voltage decreases as the absolute level of voltage increases. Thus the 2.5 volt line and the 3.0 volt line substantially coincide over an appreciable range. Therefore there is a limit to the increase in sensitivity which can be obtained by increasing the applied voltage. For most measuring purposes, a voltage of about 1.2 volts D.C. has been found to be satisfactory, and generally speaking voltages between about 0.3 volt D.C. and about 3.5 volts D.C. may be used.

Lower voltages result in lower sensitivity. Higher voltages, while operative, accelerate the formation of a film on the electrodes. This effect is more noticeable at high fluoride concentrations than at low concentrations. This film interferes in varying degrees with the measurement. At the preferred voltage the film presents only a minor problem since it is easily removed by chemically etching the electrodes, and further, it does not form at an excessive rate. A suitable cleaning solution for the electrodes is 50 ml. of concentrated nitric acid plus 30 ml. of 49 percent hydrofluoric acid plus 30 ml. of glacial acetic acid.

The manual cleaning step outlined just above is inconvenient in a system designed to be operated continuously. In accordance with the invention, equipment to be described later, makes it possible to remove the accumulated film automatically.

It may also be pointed out here that for any given voltage there is a very slight drift at the outset of the measuring step, but that the current readings quickly assume a steady state value. Factors which are not completely understood cause this drift. There is no substantial problem either with the initial drift or with cell polarization which is sometimes encountered in electrochemical apparatus. A consideration of FIGURE 3 will also make it clear that once an operating voltage is selected, it is important to maintain the voltage substantially constant from measurement to measurement to eliminate the variations in the current-activity relationship resulting from voltage changes.

FIGURE 4 illustrates the effect on the cell current-fluoride activity relationship which is brought about by changes in the area of the p-type silicon electrode exposed to the sample. From this figure it can be seen that an increase in the exposed area of electrode, at a given voltage, results in an increase in the slope of the line defining the relationship, and hence in the sensitivity. At low concentrations of fluoride activity this forms a useful way to increase the sensitivity.

FIGURE 5 presents a series of curves developed by varying the fluoride activity in a series of solutions, to illustrate the effect of other anions on the relationship. It should first be noted that the various curves lie close together at dilute concentrations, and thus approximate the same generally straight lines. However, at higher fluoride activities, the curves diverge and as the activity is further increased, the curves flatten out so that sensitivity is for the most part lost in the higher activity regions.

A consideration of the curves for 2 molar hydrochloric acid and 0.5 molar hydrochloric acid concentration will show that in the dilute regions, for example up to about .1 gram-ion per liter of fluoride activity the curves are sufficiently close together to be regarded as a single curve. That is to say, in the dilute region the method and apparatus of the present invention are substantially insensitive to changes in the concentration of a given additional anion. In this regard, the curves for hydrochloric acid may be regarded as typical of curves for various concentrations of other anions.

When the concentration of the anion other than that causing the fluoride activity is known, calibration curves, such as those shown in FIGURE 5, can be developed for the range of concentration of interest.

FIGURE 6 illustrates an arrangement of the equipment of the invention which is adapted for continuous operation. In this figure a bath of fluoride containing solution is indicated at 30. A sample line 31 is connected to the bath and extends generally upwardly to terminate in a discharge opening 32 above the bath. The sampling line 31 is shown in the drawing partly as a solid line and partly as piping. The line is provided with a U-shaped section so that when solution is being pumped through it, it will run full at least in the U-shaped part of the line. A pump 33 is mounted in the sampling line for continually withdrawing liquid from the bath and pumping it into and through the sampling line.

The U-shaped section of sampling line 31 constitutes the sample cell in this embodiment of the invention and the cell may be thought of as occupying the section of sampling line 31 lying between lines A—A and B—B. Within the cell there is mounted a p-type silicon electrode 14 of the kind described above in connection with FIGURES 1 and 2. The mounting means for this electrode may be of any convenient type, although it can be pointed out that the method of mounting used in the sample cell of FIGURE 1 is quite satisfactory. An inert electrode 15, preferably of platinum, is also mounted in the sample cell. It is positioned adjacent the silicon electrode 14. Preferably both these electrodes are mounted in a section of the sampling line where it runs full. The mounting means for inert electrode 15 can be the same as those used in the cell of FIGURE 1.

A second inert electrode 34 is mounted in the sample cell. It can be made of any inert conducting material although platinum is the preferred material. The second inert electrode 34 should be placed at a convenient point near the other electrodes although it need not be closely adjacent.

We have discovered that the film which may have a detrimental effect on the accuracy of the current readings from the measuring cell is concentrated on the inert electrode 15. We have found that this film can be effectively removed from electrode 15 in the following way. First the voltage across the pair of electrodes 14 and 15, in which the silicon electrode is anodic and the inert electrode is cathodic, is removed. Then a voltage is impressed across the film coated first inert electrode 15 and the second or supplementary inert electrode 34. The sign of this voltage is such that the first or film coated electrode is anodic and the supplementary electrode is cathodic. The side of the cleaning voltage is made large enough to insure that gas will be evolved at the first electrode 15. The evolving gas tends to break up and carry off the objectionable film. While the magnitude of the voltage may vary somewhat depending upon operating conditions, a voltage of about 2.8 volts has been found adequate for an apparatus arranged in accordance with FIGURE 6. Furthermore, the length of time that the cleaning voltage should be applied may also be varied, although care should be taken to insure that the time is long enough for the evolving gas to break away all of the film. In the system of FIGURE 6 a cleaning time of about 10 seconds was found adequate using the 2.8 volt potential mentioned above.

The cleaning operation should be performed at intervals frequent enough to insure that the readings remain within acceptable limits of accuracy throughout the periods between cleaning. For example, when the system of FIGURE 6 was used to monitor an acidic solution containing approximately 0.5 gram per liter of fluoride ion, performance of the cleaning step every half hour proved to be adequate. More severe conditions will, of course, require more frequent cleaning. In FIGURE 6 there is illustrated, somewhat diagrammatically, equipment for cleaning the inert electrode 15 at pre-selected intervals and for applying the measuring voltage during the time between the cleaning operations. This equipment includes D.C. power supply 35, and a timing unit indicated generally at 36.

Timing unit 36 includes a synchronous motor 37 driving a shaft 38 on which are mounted cams 39a, 39b and 39c. An electrical conductor 40 runs between silicon electrode 14 and timing unit 36 and rheostat R may conveniently be mounted in line 40. Another conducting line 41 connects the first inert electrode 15 to the timing mechanism, while still another conductor 42 connects the second inert electrode to a timing device.

The positive side of the power supply 35 is connected into the timing device at two points. The first is at a post of switch SW–a, which switch is operated by cam 39a. The arm of switch SW–a is connected to line 40. Thus, when cam 39a holds switch SW–a closed or down, the positive side of the voltage originating at the power supply is delivered to silicon electrode 14. When cam 39a operates to open switch SW–a, silicon electrode 14 is electrically isolated from the power supply.

The second point at which the positive side of the power supply is connected into the timing unit is the switch SW–b. It is connected to a post of that switch so that it will contact the arm of the switch when it is in the up position as FIGURE 6 is drawn. As can be seen from the figure, the positive side of the power supply is not delivered to inert electrode 15 at a time when it is delivered to silicon electrode 14.

The negative side of the power supply is delivered to the timing unit in two places. The first is at a post of switch SW–b. This post is contacted by the arm of the switch when it is at the down position as the figure is drawn. The arm of switch SW–b is connected to inert electrode 15 by line 41. Thus it can be seen that when switch SW–b is down, the negative side of the voltage is delivered to the inert electrode 15 and when the arm is up, the positive side of the voltage is delivered to that electrode.

The negative side of the voltage is also delivered to the timing unit at a post of switch SW–c. This post is positioned so that the arm of switch SW–c contacts it when the switch is at the up position. The second inert electrode 34 is connected to the arm of switch SW–c, and it can be seen that a negative potential is delivered to that electrode when switch SW–c is in the up position.

Motor 37 of the timing unit 36 is operated continuously. The 3 cams 39a, b, and c may have the same profile and are positioned on the shaft with respect to one another so that they hold all of the switches in their down positions at the same time and move them to their up positions at the same time.

In a typical installation, the timing motor 37 can be arranged to rotate shaft 38 once every half hour. The cams in such a case are profiled to hold switches SW–a, SW–b and SW–c in their down positions for most of the half hour period and to move the switches to their up positions for a short interval such as about ten seconds at the end of the half hour period. In this way, during most of the cycle, the silicon electrode 14 is anodic, the first inert electrode 15 is cathodic, and the ammeter A is connected into the circuit for measuring purposes. During the relatively short cleaning portion of the cycle, silicon electrode 14 and ammeter A are out of the circuit while first inert electrode 15 is anodic and second inert electrode 34 is cathodic.

Those skilled in the art will understand that other specific arrangements of timing device and timing cycles can be made for practice of the invention.

By way of summary, certain preferences in the construction and operation of the apparatus and method may be pointed out. The silicon electrode must be of p-type, and is preferably a single crystal. The surface of this electrode which is presented to the solution may be of any convenient size but very satisfactory operation is obtained when about 0.5 square inch is used. The spacing between electrodes may be any convenient distance. The inert electrode may be of any material which does not appreciably react with the solutions being tested and platinum meets this requirement very well. The voltages placed across the cell may vary from about 0.3 volt D.C. to about 3.5 volts D.C. with the preferred potential being about 1.2 volts D.C. The method and equipment when so arranged will measure fluoride activity in the range from about 0 gram-ion per liter to about 1.5 gram-ions per liter. More concentrated solutions may easily be measured by diluting the sample with a known amount of water to lower the concentration to within the range of the equipment.

It can be seen that the method and apparatus of this invention provide the art with a versatile and reliable means for measuring the fluoride activity of aqueous acid solutions.

We claim:

1. Apparatus for measuring the level of fluoride activity in an acid solution comprising a cell adapted to contain a sample of said solution, a p-type silicon electrode positioned in said cell, said electrode having a constant exposed area, a first inert electrode positioned in said cell, a second inert electrode positioned in said cell, external voltage supply means for placing and maintaining a constant voltage of from about 0.3 volt to about 3.5 volts across the silicon electrode and said first inert electrode with the positive side of the voltage at the silicon electrode, external current measuring means for measuring the current passing between said silicon electrode and said first inert electrode when said constant voltage is maintained across them, and means for alternately removing said constant voltage and placing a D.C. voltage across said inert electrodes with the positive side of the voltage at said first inert electrode.

2. Apparatus for measuring the level of fluoride activity in an acid solution comprising a cell adapted to contain a sample of said solution, a p-type silicon electrode positioned in said cell, the electrode having a constant exposed area, a first inert electrode positioned in said cell, a second inert electrode positioned in said cell, switch means for establishing a first circuit in which a D.C. voltage is placed across said silicon electrode and said first inert electrode with the positive side of said voltage at said silicon electrode and for establishing a second circuit in which a D.C. voltage is placed across said inert electrodes with the positive side of said voltage at said first inert electrode, timing mechanism connected with said switch means for operating the switch means to establish said two circuits alternately and means for measuring the current flowing through the first of said circuits.

3. A method for measuring the level of fluoride activity in acidic aqueous solution in the range of from about 0.0 gram-ions/liter to about 1.5 gram-ions/liter of active fluoride, expressed as fluoride ion comprising establishing a first series D.C. circuit having a voltage of from about 0.3 volt to about 3.5 volts from an external source, and a current path which includes said voltage source, a p-type silicon anode of constant pre-selected area, said solution, and a first inert electrode operating cathodically, maintaining said voltage across the electrodes at a constant value within the specified range, thereby passing a current through the solution between said electrodes, passing said current between said electrodes until it assumes a steady-state magnitude which is a function of the level of fluoride activity, measuring the current developed in said circuit, periodically establishing a second series D.C. circuit having a voltage source and a current path which includes said voltage source, said first inert electrode operating anodically, said solution, and a second inert electrode operating cathodically, and applying a voltage to said second circuit sufficient in magnitude to effect evolution of gas at said first inert electrode.

References Cited

UNITED STATES PATENTS

| | | | |
|---|---|---|---|
| 2,898,282 | 8/1959 | Flook et al. | 204—195 |
| 3,179,581 | 4/1965 | Lewin et al. | 204—195 |
| 3,219,556 | 11/1965 | Arthur et al. | 204—195 |

OTHER REFERENCES

Brattain et al.—"Bell System Technical Jour."—1955, vol. 34, pp. 129–131.

Flynn—"J. of Electrochemical Soc."—1958, vol. 105, pp. 715–718.

Turner—"Analytical Chemistry"—June 1961, vol. 33, No. 7, pp. 959–960.

Turner—"J. of Electrochemical Soc."—1960, vol. 107, pp. 810–816.

Uhlir—"Bell System Technical Jour."—1956, vol. 35, pp. 333–347.

ROBERT K. MIHALEK, *Primary Examiner.*

JOHN H. MACK, *Examiner.*

T. TUNG, *Assistant Examiner.*